Feb. 22, 1972  C. D. ADAMS  3,644,491
SYNTHESIS OF 2-UREIDOOXYPROPIONIC ACID ESTERS
Filed Nov. 29, 1968
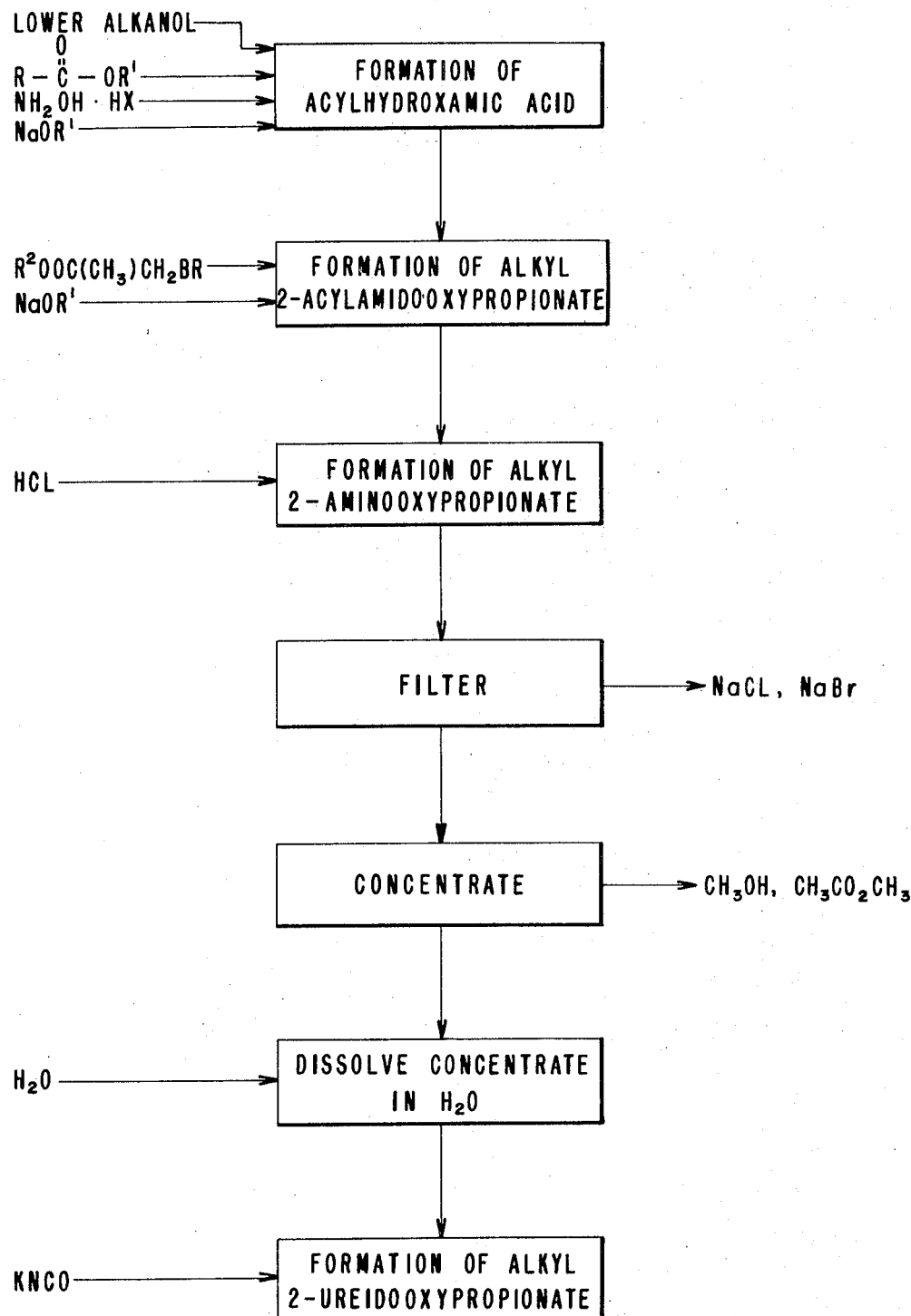
INVENTOR
CHARLES D. ADAMS
BY John R. Powell
ATTORNEY United States Patent Office 3,644,491
Patented Feb. 22, 1972

3,644,491
SYNTHESIS OF 2-UREIDOOXYPROPIONIC ACID ESTERS
Charles D. Adams, Wilmington, Del., assignor to E. I. du Pont de Nemours and Company, Wilmington, Del.
Filed Nov. 29, 1968, Ser. No. 779,914
Int. Cl. C07c *127/14*
U.S. Cl. 260—482 R      7 Claims

ABSTRACT OF THE DISCLOSURE

Esters of 2-ureidooxypropionic acid, such as the methyl ester, are prepared by the steps of (a) forming acetohydroxamic acid by reaction of methyl acetate with an acid salt of hydroxylamine and sodium methoxide in methanol;
(b) forming methyl 2-acetamidooxypropionate by reacting the product of (a) with sodium methoxide and then methyl 2-bromopropionate;
(c) forming methyl 2-aminooxypropionate hydrochloride by reacting the product of (b) with anhydrous hydrogen chloride, filtering the reaction mixture and concentrating the filtrate;
(d) forming methyl 2-ureidooxypropionate by dissolving the concentrated filtrate in water and then reacting it with an alkali metal cyanate.

Ethyl 2-ureidooxypropionate is formed by the same four-step reaction wherein ethanol replaces methanol, sodium ethoxide replaces sodium methoxide, ethyl acetate replaces methyl acetate, and ethyl 2-bromopropionate replaces methyl 2-bromopropionate. These products are plant growth regulants as disclosed in U.S. Pat. No. 3,282,987.

BACKGROUND OF THE INVENTION

This invention relates to a process for the preparation of 2-ureidooxypropionic acid esters and more particularly is directed to the process for preparing the lower alkyl esters of 2-ureidooxypropionic acid by the steps of:

(a) reacting sodium alkoxide in a lower alkanol solvent with an acid salt of hydroxylamine and a compound of the formula

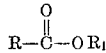

wherein R is H, methyl or ethyl; and $R^1$ is methyl or ethyl to form the corresponding hydroxamic acid;
(b) reacting the product of (a) with a 2-bromopropionic acid ester of the formula $BrCH(CH_3)CO_2R^2$ wherein $R^2$ is methyl or ethyl; in the presence of additional sodium alkoxide;
(c) adding anhydrous hydrogen chloride to the slurry obtained from (b) to form the alkyl 2-aminooxypropionate hydrochloride; and
(d) filtering the product of (c), concentrating the filtrate at an elevated temperature, dissolving the concentrate in water and reacting the aqueous solution of alkyl 2-aminooxypropionate hydrochloride with an alkali metal cyanate to form alkyl 2-ureidooxypropionate which can be recovered from the aqueous reacting mixture by extraction with an organic solvent such as methylene chloride and then evaporation of the organic solvent.

These esters are known in the art, as disclosed in U.S. Pat. 3,2882,987 and were prepared such as by the procedure disclosed in that patent. There hydroxylamine hydrochloride was reacted with ethyl benzoate in the presence of potassium hydroxide to form benzohydroxamic acid, which was isolated and reacted with 2-bromopropionic acid in the presence of a base to form 2-benzamidoxypropionic acid which was also isolated. Acid hydrolysis converted the 2-benzamidooxypropionic acid to 2-aminooxypropionic acid hydrochloride which was also isolated. Esterification was carried out with methanol or ethanol followed by product isolation. The product hydrochloride was then neutralized with ammonia and reacted with isocyanic acid to yield the alkyl 2-ureidooxypropionate. Because this process requires a large number of steps, and isolation of numerous intermediates, it is costly, time consuming, and inconvenient, and results in low yields of the final product.

Another prior art process disclosed in U.S. Pat. No. 3,238,200, starts with benzohydroxamic acid, which can be prepared by methods well-known to the art, and reacts the acid with ethyl 2-bromopropionate to give ethyl 2-benzamidooxypropionate which is then converted to 2-aminooxypropionic acid hydrochloride. Ethyl 2-aminooxypropionate hydrochloride is then formed by reaction of the acid hydrochloride with ethanol and the resulting ester is reacted with potassium cyanate to give ethyl 2-ureidooxypropionate. This process is also inefficient and time-consuming and results in inferior yields.

The process of this invention is an improvement over prior art processes in that none of the intermediates are isolated during the process. This process advantage results in shorter operating times, greater efficiencies, lower costs, and improved yields.

SUMMARY

In summary, this invention is directed to a process for preparing alkyl esters of 2-ureidooxypropionic acid comprising the steps:

(a) agitating a mixture of sodium alkoxide with an acid salt of hydroxylamine and a compound of the formula

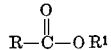

wherein R is hydrogen, methyl or ethyl, and $R^1$ is methyl or ethyl, in a lower alkanol solvent at a temperature of from 30° C. to reflux—
(b) adding to the slurry formed in step (a) additional sodium alkoxide and a compound of the formula

wherein $R^2$ is methyl or ethyl,
and agitating the reaction mixture at a temperature of from 30° C. to reflux until reaction is substantially complete;
(c) adding to the reaction mixture of step (b) anhydrous hydrogen chloride while maintaining the temperature at from 30° C. to reflux;
(d) filtering the product of step (c), concentrating the filtrate by distilling the filtrate until it reaches a temperature in excess of about 95–100° C., then dissolving the filtrate in water and reacting it with an alkali metal cyanate.

The alkyl ester of 2-ureidooxypropionic acid can then be recovered by means well-known to the art.

This process provides an economical and convenient method for preparing the alkyl esters of 2-ureidooxypropionic acid in good yield. The product esters are useful as plant growth regulants as disclosed in U.S. Pat. No. 3,282,987.

BRIEF DESCRIPTION OF DRAWING

The drawing is a flow-sheet diagram illustrating the process of this invention. The symbols R, $R^1$ and $R^2$ depicted in the drawing have the meanings assigned to them above.

DESCRIPTION OF THE INVENTION

This invention is directed to a process for the preparation of alkyl esters of 2-ureidooxypropionic acid. In the following detailed description, for reasons of simplicity, the process will be shown for the preparation of the methyl ester of 2-ureidooxypropionic acid. By substituting the indicated alternative reactants, the ethyl ester of 2-ureidooxypropionic acid can similarly be prepared.

Step (a)

Formation of acetohydroxamic acid by the reaction $$CH_3CO_2CH_3 + NH_2OH.HX + NaOCH_3 \xrightarrow{CH_3OH} CH_3CONHOH + NaX + 2CH_3OH$$

wherein X represents the conjugate base of the acid HX, which acid can be hydrochloric or sulfuric.

Step (a) is carried out by charging methyl acetate, an acid salt of hydroxylamine such as hydroxylamine hydrochloride, sodium methoxide, and methanol to the reactor and agitating the mixture at a temperature of from 30° C. to reflux until formation of acetohydroxamic acid is complete. At the conclusion of the reaction mass is a slurry composed of insoluble sodium chloride and a methanolic solution of acetohydroxamic acid.

The order of addition of reactants is not critical. The sodium methoxide can be added as a solid or in methanol solution. When a methanol solution is used, methanol need not be charged separately to the reactor, permitting higher concentration of reactants. A preferred order of addition is to charge methanol, methyl acetate, and hydroxylamine hydrochloride to the reactor, then heat and stir the reactants until most of the hydroxylamine hydrochloride is dissolved and then add the sodium methoxide as a methanolic solution.

Concentration of reactants is not critical but higher concentrations are ordinarily preferred because of increased economy. A practical concentration limit is one mole of hydroxylamine hydrochloride, one mole of methyl acetate, and one mole of sodium methoxide as a 25% by weight methanolic solution. The preferred mole ratio for the three reactants is 1:1:1 although mole ratios are not critical and other ratios can be employed with attendant economic disadvantages.

The reaction time ordinarily varies from about 15 to 90 minutes and the temperature can range from 30° C. to reflux. Preferred conditions are 60 minutes at reflux.

Methyl formate or methyl propionate can be substituted for methyl acetate in this process step. In this event, formohydroxamic acid or propionohydroxamic acid are formed instead of acetohydroxamic acid. Hydroxylamine hydrochloride can also be replaced by hydroxylamine sulfate and only minor modifications would be required. If the sulfate is used, the solid component of the slurry will be sodium sulfate instead of sodium chloride.

When preparing the ethyl ester of 2-ureidooxypropionic acid the following substitutions are made in step (a). Ethanol is employed as solvent instead of methanol, sodium ethoxide is substituted for sodium methoxide, and either ethyl acetate, ethyl formate, or ethyl propionate are substituted for methyl acetate. The reaction conditions remain generally the same, although the reflux temperature will, of course, be higher (80° C.). When these substitutions are made a slurry is obtained composed of solid sodium chloride and an ethanolic solution of either acetohydroxamic acid, formohydroxamic acid, or propionohydrxamic acid. This slurry can be carried forward to process step (b) as described below.

Step (b)

Formation of methyl 2-acetamidooxypropionate by the reaction $$CH_3CONHOH + BrCH(CH_3)CO_2CH_3 + NaOCH_3 \longrightarrow CH_3CONHOCH(CH_3)CO_2CH_3 + NaBr + CH_3OH$$

This process step is carried out by charging sodium methoxide and methyl 2-bromopropionate to the slurry which is obtained in process step (a) above, and then agitating until the formation of methyl 2-acetamidooxypropionate is complete. The sodium methoxide converts acetohydroxamic acid to its sodium salt. The sodium salt of acetohydroxamic acid then reacts with methyl 2-bromopropionate to form methyl 2-acetamidooxypropionate. At this point the reaction mass is a slurry which is composed of insolubles, sodium chloride and sodium bromide and a methanolic solution of methyl 2-acetamidooxypropionate.

The preferred order of addition of reactants is to add the sodium methoxide before the methyl 2-bromopropionate. The sodium methoxide can be either in solid form or in methanolic solution. An alternate addition procedure which is sometimes preferable is to add 2 moles of sodium methoxide instead of 1 mole during the formation of acetohydroxamic acid in process step (a). The sodium salt of acetohydroxamic acid instead of acetohydroxamic acid is thus formed in process step (a). The advantage is that only one addition of sodium methoxide to the reactor is required instead of two.

Concentrations are not critical in step (b), but again high concentrations are preferred for economic reasons. It is apparent that the concentrations used in process step (b) are dependent on those used in process step (a).

The preferred mole ratios for the three reactants, acetohydroxamic acid, sodium methoxide, and methyl 2-bromopropionate can vary from 1.0:1.5:1.5 respectively, to 1.5:1.5:1.0 respectively, depending upon the desired outcome. When excess sodium methoxide and methyl 2-bromopropionate are used, the yield based on acetohydroxamic acid is maximized. When excess acetohydroxamic acid is employed, the yield based on methyl 2-bromopropionate is maximized.

The reaction time can be from a few seconds to 60 minutes, and the temperature can be from 30° C. to reflux. The preferred conditions are 30 minutes at reflux.

If methyl formate or methyl propionate have been used in process step (a) instead of methyl acetate, then the product of process step (b) will be methyl 2-formamidooxypropionate or methyl 2-propionamidooxypropionate instead of methyl 2-acetamidooxypropionate.

If the ethyl ester instead of the methyl ester of 2-ureidooxypropionic acid is desired, the following modifications are made. Sodium ethoxide, rather than sodium methoxide, and ethyl 2-bromopropionate, rather than methyl 2-bromopropionate, are charged to the ethanolic slurry obtained by the modified process step (a). With the exception of the reflux temperature, which will be higher, the process conditions remain the same. What is obtained from process step (b) using this modification is a slurry composed of insolubles, sodium chloride and bromide, and an ethanolic solution of either ethyl 2-acetamidooxypropionate, ethyl 2-formamidooxypropionate, or ethyl 2-propionamidooxypropionate, depending upon the starting materials used.

Step (c)

Formation of methyl 2-aminooxypropionate hydrochloride by the reaction

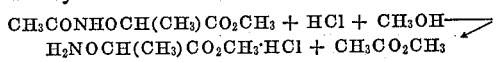

CH₃CONHOCH(CH₃)CO₂CH₃ + HCl + CH₃OH → 
H₂NOCH(CH₃)CO₂CH₃·HCl + CH₃CO₂CH₃

This process step is carried out by adding anhydrous hydrogen chloride to the slurry obtained in process step (b) and agitating until reaction is complete. The reaction mass is then a slurry composed of insolubles, sodium chloride and sodium bromide, and a methanolic solution of methyl 2-aminooxypropionate hydrochloride.

The manner of hydrogen chloride addition is not critical. A preferred method is to add it as a gas through a dip tube which extends below the agitated surface of the slurry. The gas absorption is exothermic and it is sometimes desirable to provide cooling for the reactor so that higher feed rates can be employed.

The reaction time can range from 15 to 120 minutes and the temperature can range from 30° C. to reflux. The concentrations in this step will be dependent upon those used in the two previous process steps.

The mole ratio of methyl 2-acetamidooxypropionate and hydrogen chloride can vary from 1.0:1.0 respectively, to 1.0:2.0 respectively. The preferred ratio is from stoichiometric to a slight excess (0–20%) of hydrogen chloride.

If the ethyl ester of 2-ureidooxypropionic acid is desired, anhydrous hydrogen chloride is added to the ethanolic slurry obtained from the modified process step (b). The conditions remain substantially the same except that the reflux temperature is higher.

Step (d)

Formation of methyl 2-ureidooxypropionate by the reaction

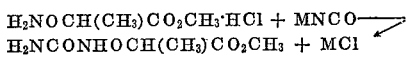

H₂NOCH(CH₃)CO₂CH₃·HCl + MNCO → 
H₂NCONHOCH(CH₃)CO₂CH₃ + MCl wherein M is an alkali metal ion.

Step (d) of the process is begun by filtering the slurry which is obtained from process step (c). Inorganic by-products remain on the filter while the filtrate contains methyl 2-aminooxypropionate hydrochloride in solution. The filtrate is concentrated by distillation until the temperature of the residue is in excess of approximately 95–100° C. Methanol, methyl acetate, and any excess hydrogen chloride are removed as volatiles while the residue consists essentially for methyl 2-aminooxypropionate hydrochloride.

Water is then added to dissolve the residue. The alkali metal cyanate, either in solid form or as a solution, is added to the aqueous solution and reaction occurs to form the desired products, methyl 2-ureidooxypropionate. As an optional step, the aqueous solution can be extracted with an organic solvent, such as methylene chloride, to remove neutral, non-volatile organic by-products prior to addition of the alkali metal cyanate.

Concentrations are not critical during the reaction between methyl 2-aminooxypropionate hydrochloride and the alkali metal cyanate; however, high concentrations are desirable for economic reasons. A practical upper concentration limit is reached when solid alkali metal cyanate is added to a solution of 1 part of methyl 2-aminooxypropionate hydrochloride and 1 part of water. The order of addition is not critical and a reverse order can be used. The preferred mole ratio for methyl 2-aminooxypropionate hydrochloride and alkali metal cyanate is 1:1. Other mole ratios can be used but are less economical. The preferred alkali metal cyanates are sodium and potassium cyanate.

The preferred reaction time is from 5 to 60 minutes. Ambient temperatures can be employed. The reaction is exothermic and cooling is employed if a temperature rise is undesirable.

The product can be recovered by means well known to the art, for example, the resulting aqueous solution can be extracted with a water-immiscible organic solvent in order to separatet the product from the by-product alkali metal chloride. A preferred solvent is methylene chloride. Evaporation of the organic extract leaves the product as a non-volatile residue. Alternatively, an organic solvent which is a poor solvent for the product, n-hexane for example, can be added to the extract with the result that the product precipitates and is recovered by filtration. Cooling the extract will also give a precipitate of the product.

An alternate procedure for process step (d) which employs methanol instead of water as reaction solvent, is as follows. Instead of filtering the slurry which is obtained from process step (c), alkali metal cyanate is added and agitation is continued until the reaction between methyl 2-aminooxypropionate hydrochloride and the alkali metal cyanate is complete. The reaction mass is then filtered. The inorganic by-products, alkali metal chloride, sodium chloride, and sodium bromide remain on the filter while the product is in the filtrate. Evaporation of the filtrate removes methanol and methyl acetate as volatiles and leaves the product, methyl 2-ureidooxypropionate as the residue.

The concentrations in this variation of process step (d) are again dependent on those used in the previous steps. The preferred mole ratio for the alkali metal cyanate and methyl 2-aminooxypropionate hydrochloride is 1:1. The preferred reaction time is from 5 to 60 minutes. Ambient temperatures can prevail and cooling is employed if a temperature rise is to be avoided.

Only minor changes are required in process step (d) if methyl formate or methyl propionate are substituted for methyl acetate in process step (a).

Also, if the ethyl ester of 2-ureidooxypropionic acid is desired, the conditions remain essentially the same except that during the distillation of the ethanolic filtrate a higher residue temperature is permitted than when the methanolic filtrate is concentrated.

In the following illustrative examples, parts and percentages are by weight unless otherwise indicated.

EXAMPLE I

To 159 parts of methanol are added 53.0 parts of hydroxylamine hydrochloride, 56.3 parts of methyl acetate, and 160 parts of 25.6% sodium methoxide in methanol solution. The mixture is stirred at 65° C. (reflux) for an hour and is then cooled to 60° C. Another 160 parts of 25.6% sodium methoxide solution is added, followed by 129 parts of methyl 2-bromopropionate. The resulting reaction mass is stirred at 67° C. (reflux) for 30 minutes.

It is then cooled at 35° C., while 32 parts of anhydrous chloride is sparged into it. When the hydrogen chloride sparge is completed, refluxing is resumed and continued for 1.5 hours. The reaction mass is then cooled and filtered. The filter cake is washed with 80 parts of methanol.

The combined filtrate and wash is concentrated by boiling until the residue temperature reaches 95° C. The residue is cooled to 30° C. and 300 parts of water and 134 parts of methylene chloride are added. After thorough mixing, the methylene chloride layer is drained off and discarded. The aqueous layer amounts to 450 parts and has a neutral equivalent of 554 as determined by titration of a sample with 0.1 N sodium hydroxide.

To the aqueous layer is added at solution of 65.8 parts of potassium cyanate in 140 parts of water. The reaction mass is transferred to a liquid-liquid extractor and extracted continuously for 7.5 hours with methylene chloride. The methylene chloride extract (675 parts) is diluted with 340 parts of hexane and cooled. Filtration and drying gives 84.4 parts (68.7% yield) of methyl 2-ureido-oxypropionate, which exhibits a melting point of 72–73° C.

If a 30% excess of methyl 2-bromopropionate and a corresponding amount of sodium methoxide are used, the yield based on hydroxylamine hydrochloride is increased to 80%.

EXAMPLE II

The procedure of Example I is repeated except that 45.7 parts of methyl formate is substituted for 56.3 parts of methyl acetate, and a similar product yield is obtained.

EXAMPLE III

The procedure of Example I is repeated except that 67.0 parts of methyl propionate is substituted for 56.3 parts of methyl acetate, and a similar product yield is obtained.

EXAMPLE IV

To 600 parts of ethanol are added 56.6 parts of hydroxylamine hydrochloride. The slurry is stirred at reflux while 70.5 parts of ethyl acetate and 109 parts of sodium ethoxide as a solution in 1000 parts of ethanol are added. The resulting reaction mass is stirred at reflux (80° C.) for 1.25 hours. Then 145 parts of ethyl 2-bromopropionate are added during 5 minutes. The reaction mass is stirred at reflux for an additional 30 minutes.

It is then cooled at 450 C. while 35 parts of anhydrous hydrogen chloride is sparged into it. When the hydrogen chloride sparge is finished, refluxing is resumed and continued for 2 hours. The reaction mass is cooled and filtered. The filter cake is washed with 80 parts of ethanol.

The combined filtrate and wash is concentrated by boiling until the residue temperature reaches 110° C. The residue is cooled to 30° C. and 300 parts of water and 134 parts of methylene chloride are added. After mixing, the methylene chloride layer is drained off and discarded. The aqueous layer amounts of 470 parts and has a neutral equivalent of 585 as determined by titration with 0.1 N sodium hydroxide.

To the aqueous layer is added a solution of 65.0 parts of potassium cyanate in 140 parts of water. After stirring for 30 minutes, the reaction mass is extracted with methylene chloride (6×135 parts). The methylene chloride extract is dried by azeotropic distillation of the water and is then evaporated. The residue consists of 99.0 parts of ethyl 2-ureidooxypropionate which exhibits a melting point of 72–74° C.

EXAMPLE V

The procedure of Example I is repeated except that 52.8 parts of sodium cyanate is substituted for the 65.8 parts of potassium cyanate, and a similar product yield is obtained.

EXAMPLE VI

To 159 parts of methanol are added 53.0 parts of hydroxylamine hydrochloride, 56.3 parts of methyl acetate, and 160 parts of 25.6% sodium methoxide in methanol solution. The mixture is stirred at 65° C. (reflux) for an hour and is then cooled to 60° C. Another 160 parts of 25.6% sodium methoxide solution is added, followed by 129 parts of methyl 2-bromopropionate. The resulting reaction mass is stirred at 67° C. (reflux) for 30 minutes.

It is then cooled at 35° C., while 28 parts of anhydrous hydrogen chloride is sparged into it. When the hydrogen chloride sparge is completed, refluxing is resumed and continued for 1.5 hours. The reaction mass is then cooled to 30° C. Solid potassium cyanate (62.0 parts) is charged to the reactor and the resulting slurry is stirred at ambient temperature for an hour. It is then filtered and the insolubles are washed with 80 parts of methanol. Evaporation of the combined filtrates and wash gives a good yield of methyl 2-ureidooxypropionate as a non-volatile residue.

I claim:

1. A process for preparing alkyl esters of 2-ureidooxypropionic acid comprising the steps:

(a) agitating a mixture of a sodium alkoxide of the formula $$NaOR^1$$

with hydroxylamine hydrochloride or hydroxylamine sulfate and a compound of the formula

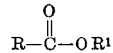

wherein R is hydrogen, methyl or ethyl, and $R^1$ is methyl or ethyl,
   in an alcohol solvent of the formula $$R^1OH$$

at a temperature of from 30° C. to reflux until the reaction is substantially complete;

(b) adding to the slurry formed in step (a) additional sodium alkoxide of the formula $NaOR^1$ and a compound of the formula $$BrCH(CH_3)CO_2R^2$$

wherein $R^2$ is methyl or ethyl, and agitating the reaction mixture at a temperature of from 30° C. to reflux until the reaction is substantially complete;

(c) adding to the reaction mixture of step (b), anhydrous hydrogen chloride while maintaining the temperature at from 30° C. to reflux;

(d) filtering the product of step (c), concentrating the filtrate until it reaches a temperature in excess of about 95–100° C., then dissolving the residue in water and reacting it with an alkali metal cyanate to yield the methyl or ethyl ester of 2-ureidooxypropionic acid.

2. A process of claim 1 wherein the sodium alkoxide is sodium methoxide, the solvent is methanol, the compound of the formula

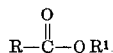

is methyl acetate and the compound of the formula $BrCH(CH_3)CO_2R^2$ is methyl 2-bromopropionate.

3. A process of claim 1 wherein the sodium alkoxide is sodium ethoxide, the solvent is ethanol, the compound of the formula

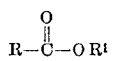

is ethyl acetate and the compound of the formula $BrCH(CH_3)CO_2R^2$ is ethyl 2-bromopropionate.

4. A process of claim 1 wherein the hydroxylamine salt is hydroxylamine hydrochloride.

5. A process of claim 1 wherein the alkali metal cyanate is potassium cyanate.

6. A process of claim 1 wherein the alkali metal cyanate is sodium cyanate.

7. A process for preparing alkyl esters of 2-ureidooxypropionic acid comprising the steps:

(a) agitating a mixture of a sodium alkoxide of the formula $$NaOR^1$$

with hydroxylamine hydrochloride or hydroxylamine sulfate and a compound of the formula

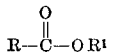

wherein R is hydrogen, methyl or ethyl, and $R^1$ is methyl or ethyl,
   in an alcohol solvent of the formula $$R^1OH$$

at a temperature of from 30° C. to reflux until the reaction is substantially complete;

(b) adding to the slurry formed in step (a) additional sodium alkoxide of the formula $NaOR^1$ and a compound of the formula $$BrCH(CH_3)CO_2R^2$$

wherein $R^2$ is methyl or ethyl, and agitating the reaction mixture at a temperature of from 30° C. to reflux until the reaction is substantially complete;

(c) adding to the reaction mixture of step (b), anhydrous hydrogen chloride while maintaining the temperature at from 30° C. to reflux;

(d) reacting an alkali metal cyanate with the product of step (c) in methanol, filtering off the inorganic salts, and concentrating the filtrate to obtain the methyl or ethyl ester of 2-ureidooxypropionic acid.

References Cited
UNITED STATES PATENTS 3,282,987  11/1966  Ellis _____ 260—482 X LORRAINE A. WEINBERGER, Primary Examiner P. J. KILLOS, Assistant Examiner U.S. Cl. X.R.

260—491, 500.5 H, 638 R